A. McKELLAR.
VISIBLE MEASURE DISPENSING APPARATUS.
APPLICATION FILED NOV. 18, 1919.
1,383,223.
Patented June 28, 1921.
2 SHEETS—SHEET 2.
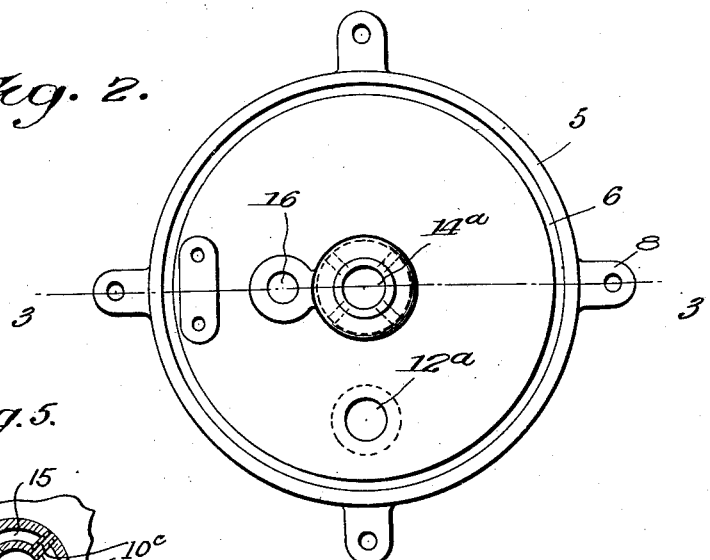
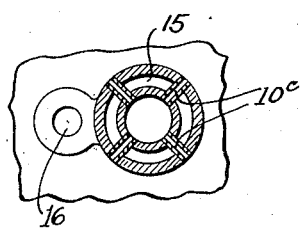
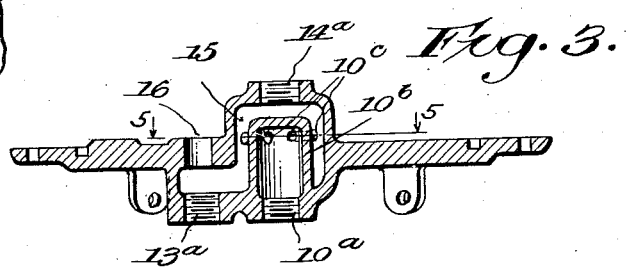
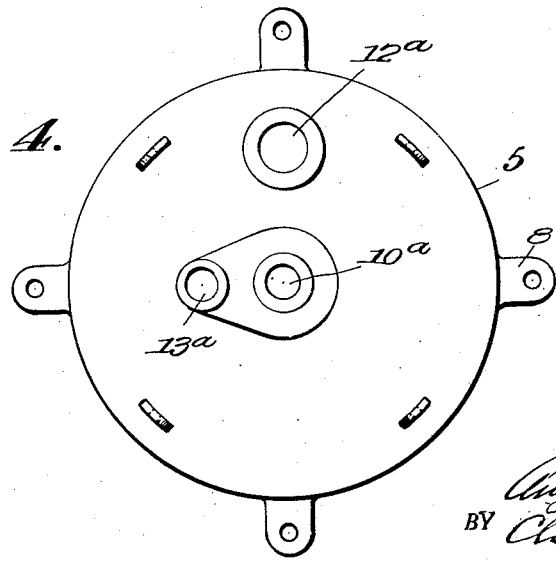
INVENTOR.
Angus McKellar,
BY Clark + Clark.
ATTORNEYS.

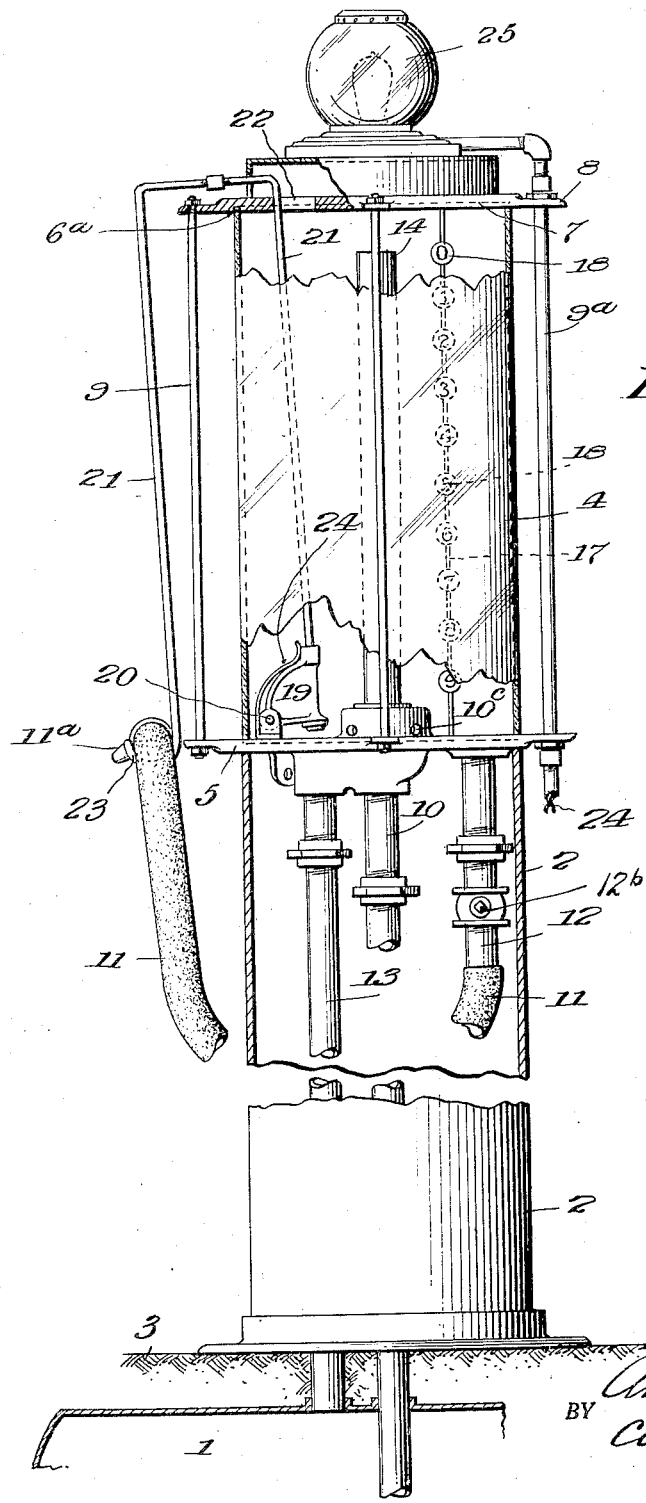

UNITED STATES PATENT OFFICE.

ANGUS McKELLAR, OF SALT LAKE CITY, UTAH.

VISIBLE-MEASURE DISPENSING APPARATUS.

1,383,223.   Specification of Letters Patent.   Patented June 28, 1921.

Application filed November 18, 1919. Serial No. 338,799.

*To all whom it may concern:*

Be it known that I, ANGUS McKELLAR, a citizen of the United States, residing at Salt Lake City, in the county of Salt Lake and State of Utah, have invented new and useful Improvements in Visible-Measure Dispensing Apparatus, of which the following is a specification.

This invention relates to liquid dispensing apparatus and pertains particularly to dispensing apparatus for the dispensing of gasolene and motor fuel.

The construction provides a measuring dispensing apparatus having a transparent calibrated receptacle adapted to receive fluid from a pump, and which is adapted to empty the required amount and to return the unused amount into the storage tank.

The construction also provides a visible measuring and dispensing apparatus in which a drain valve communicating with a storage tank and within a transparent receptacle is adapted to remain closed until actuated by the operator or until a dispensing hose is hung on a valve handle.

The invention relates particularly to the details of construction providing the supply pipe and overflow pipe for the receptacle, and the unitary one-piece construction which provides an unusually compact and useful dispensing apparatus.

The construction provides other useful combinations of a storage tank, a pump, and a transparent dispensing receptacle and particular pipe connections and valves between these parts. The apparatus is designed so as to provide a visible measuring and liquid dispensing machine so constructed that both seller and purchaser can at all times see the flow of liquid from the pump to the dispensing receptacle and from the latter to the vessel or automobile tank which is to be filled. The dispensing receptacle is graduated to conform to actual measurements and the graduations may be verified by the proper official acting as sealer of weights and measures. The liquid can be withdrawn from the dispensing receptacle only through the dispensing hose or by the automatic drain valve which latter is within the receptacle and in plain view. If the seller were to manipulate the control handle which projects from the automatic drain valve this movement could easily be detected by the purchaser.

The above and other features of the invention are described and claimed in the following specification and claims and illustrated in the accompanying drawings, in which—

Figure 1 represents in partial section an elevation of the dispensing apparatus, showing the positions of the drain valve, the supply pipe opening, and the mounting of the overflow pipe with respect thereto;

Fig. 2 is a top plan view of the lower base member of the receptacle;

Fig. 3 is a sectional view taken on the line 3—3 of Fig. 2, and

Fig. 4 is a view of the base member shown in Fig. 2, looking upward.

Fig. 5 is a fragmentary sectional view taken on the line 5—5 of Fig. 3, and showing the construction of the radially extending supply pipes.

Referring in detail to the apparatus, a storage tank is indicated by 1, and immediately above the same is the casing 2 for a pump member, not illustrated. The pump and casing are mounted on a suitable supporting structure indicated by the concrete base 3 above the storage tank 1, and this casing extends upwardly as a support member for the dispensing receptacle mounted at the upper end. This receptacle constitutes a distributing chamber and is preferably cylindrical in shape and is formed of heavy transparent glass 4. The lower end of the glass cylinder is supported on a cast iron base 5 which is rigidly secured to the supporting casing 2. The cylinder 4 is sunk into an annular depression 6 in the base 5 and is packed with suitable material to prevent the escape of the liquids from the dispensing receptacle. Where gasolene or oil is to be dispensed it has been found convenient to use a combination of cement and shellac to prevent the seepage of the material from the lower end of the glass cylinder. The upper end of the cylinder 4 is covered by cast iron covering plate 7 which is similar to the base plate 5 and which has a corresponding annular groove or depression 6ª to correspond with the depression 6 of the base plate 5. The plates 5 and 7 are provided with extensions 8 adapted to receive fastening rods 9 which extend from the base plate 5 to the top plate 7 and are adapted to be tightly fastened to clamp the glass cylinder 4 between the same. The details of the design of the base plate 5, which will be elaborated hereinafter, have an important bearing on the value of the apparatus.

The pipe connections for the apparatus may be identified from the following: 10 is the supply pipe leading from the pump (not shown) and screw threaded into the opening 10ª in the under side of the base plate 5. The dispensing hose 11 is secured to a pipe 12 which is screw threaded into the opening 12ª in the base plate 5. At the extreme end of the dispensing hose 11 is the usual delivery nozzle 11ª which when not in use is adapted to hang on the valve handle as will be described. The drain pipe 13 is screw threaded into an opening 13ª in the lower side of the base plate 5 and extends downwardly to the tank 1. An overflow pipe is shown at 14 and is screw threaded into an opening 14ª in the upper side of the base plate 5 and immediately over the supply pipe opening 10ª. The base plate, as illustrated is thicker at its central portion and provides for an upwardly extending central chamber, having walls 10ᵇ, formed as a continuation of the opening 10ª. The opening 14ª extends inwardly and encircles the walls 10ᵇ and is continued as a conduit 15 extending to the opening 13ª. The upper end of the supply pipe has laterally projecting supply pipes 10ᶜ, extending from the central chamber and from the walls 10ᵇ across the space of the encircling conduit 15 and through the upper surface of the base plate 5 at the base of the overflow pipe 14. The drain valve opening 16 is illustrated as positioned above the opening 13ª and formed in the upper face of the base plate 5. The conduit 15 constitutes an unobstructed passageway continuously functioning to carry off any overflow of superfluous gasolene from the overflow pipe 14 to the return pipe 13. The present construction is peculiarly advantageous because the single base member 5 contains integrally and compactly formed therein the passageway for overflow material 15, the drain valve opening 16, the return pipe opening 13ª for both the overflow pipe opening 14ª and the drain valve 16, in addition to the supply pipe opening 10ª and the lateral pipes 10ᶜ. An important feature is provided by the arrangement of having all of the pipes compactly positioned either above or beneath the base member 5 and within the peripheral boundary of the same. That is no pipes extend laterally or project beyond the outer edge of the base member 5. This compactness of construction is in part due to the fact that a single pipe 13 serves as a return pipe for both the overflow pipe 14 and the drain opening 16. By having the common communicating passageway 15 formed within the base member 5, it is thus possible to dispense with the otherwise necessary exterior pipe connections and at least one additional pipe below the receptacle.

As illustrated in Fig. 1 the filling receptacle is designed to contain ten gallons of gasolene or other liquid which is to be dispensed. A rod 17 is fastened in said receptacle and held at its upper and lower ends by the plates 7 and 5 respectively. Along this rod are the number plates 18 which are provided with the numbers from 0 to 10 arranged with the 0 number at the top and on a line with the top rim of the overflow pipe 14. The positions of these indicating numbers 18 may be determined by the official sealer of weights and measures when the machine is being inspected.

An automatic drain valve 19 is provided within the glass cylinder 4 and is adapted to normally close the opening 16. This valve member is pivoted at one side of the opening as indicated at 20 and is adapted to be rocked by means of a control handle 21 which extends upwardly and projects from the top of the dispensing receptacle through an opening 22 in the top plate 7. The control handle 21 extends to one side of the plate 7 and is provided with the hook-shaped end 23 constituting supporting means for the end of the dispensing hose 11 and the nozzle 11ª. A spring member 24 is provided within the receptacle and is mounted to exercise a constant pressure against the drain valve 19 to normally hold the valve 19 in the closed position, that is closing the opening 16. The weight of the hose 11 when hung on the hook 23 is sufficient to move the valve handle 21 and rock the valve 19 on the pivot 20 and permit any liquid within the receptacle to pass into the drain pipe 13.

In the operation of the apparatus, when the liquid is discharged into the glass cylinder 4 through the pipe 10 and through pipes 10ᶜ, it may not be withdrawn from the cylinder except through the dispensing hose 11 unless the operator of the machine opens the automatic drain valve 19, which action would be visible to the purchaser. In addition to the advantage that the apparatus provides in making it difficult for a salesman to provide a purchaser with short measure, the apparatus provides means for draining the dispensing receptacle each time that the apparatus is used. When the required quantity is drawn off, the hose 11 is hung on the hook 23; the valve handle 21 is moved to the left in the slotted opening 22, the automatic drain valve 19 is raised; and the liquid which is left in the dispensing cylinder 4 is allowed to return through the pipe 13 to the storage tank 1.

The dispensing pipe 12 is provided with a suitable control valve at 12ᵇ, and other valves may be added as customary and convenient. One of the fastening rods 9 is substituted by a pipe member 9ª to shield a wire 24 for an electric lamp 25 mounted on the upper cover plate member 7. In this way the pipe 9ª serves not only as a protection for the wire but as a fastening rod, suitable clamping screws being provided on the pipe 9ª above the upper plate member 7 and below the base plate member 5.

In addition to the above features, the present apparatus provides an improvement over the ordinary dispensing pump station which is acknowledged to be faulty in that short measure is quite ordinarily provided because of worn pump parts and the resultant leakage.

Another feature of advantage resides in the construction which locates a plurality of supply pipe openings about the base of the overflow pipe. By this arrangement the filling operation is performed quietly with a steady flow of liquid and there is no gushing or foaming in the liquid. The gasolene is supplied evenly through the plurality of openings 10ᶜ and does not become turbulent and foamy when supplied. The gasolene can be drawn off immediately after filling the receptacle to the proper point without the delay common in some apparatus where the operator and customer must wait for the air to pass out of the liquid, foaming to subside, and the surface of the liquid to become quiet and level. This absence of foaming and gushing is due to the arrangement of supply pipe openings which provide an even and balanced supply on all sides of the receptacle as contrasted to the use of single supply pipes or an overhead supply pipe. Single pipes in the base of the receptacle and overhead supply pipes entrap considerable quantities of air and thus cause marked periods of delay for the salesman and customer while waiting for the air to pass off.

Changes in material and size and shape of the parts, as well as changes in the relative positions of the receptacle, pump, and storage tank, may be made without departing from the scope of the invention.

What I claim is:

1. In a liquid dispensing apparatus, a dispensing receptacle, including in its lower portion a base member having formed therein an intake pipe opening, extending upwardly from the lower face of said base member and communicating with said receptacle, an independent discharge pipe opening, an upper overflow pipe opening, a lower return pipe opening, an upper drain valve opening in unobstructed communication with said return pipe opening, and a constantly open communicating passageway formed within said base member and providing a conduit between said upper overflow pipe opening and said lower return pipe opening.

2. In a liquid dispensing apparatus, a dispensing receptacle, including in its lower portion a one-piece base member having formed therein an intake pipe opening in its lower side and communicating with said receptacle, an independent discharge pipe opening in said base member, an upper overflow pipe opening in the upper side of said base member, a lower return pipe opening, an upper drain valve opening in unobstructed communication with said return pipe opening, and a constantly open communicating passageway formed within said base member and providing a conduit between said upper overflow pipe opening and said lower return pipe opening.

3. In a liquid dispensing apparatus, a dispensing receptacle, including in its lower portion a base member having formed therein an intake pipe opening communicating with said receptacle, an upper overflow pipe opening, a lower return pipe opening, an upper drain valve opening in unobstructed communication with said return pipe opening, and a constantly open communicating passageway formed within said base member and providing a conduit between said upper overflow pipe opening and said lower return pipe opening.

4. In a liquid dispensing apparatus, a dispensing receptacle, including in its lower portion, a base member having formed therein a centrally located intake pipe opening in its lower side and communicating with said receptacle, an upper overflow pipe opening positioned centrally and above said intake pipe opening, a lower return pipe opening positioned at one side of said intake pipe opening, and a constantly open communicating passageway formed within said base member and providing a conduit between said upper overflow pipe opening and said lower return pipe opening.

5. In a liquid dispensing apparatus, a dispensing receptacle, having a distributing chamber and including in its lower portion a base member for said chamber having formed therein a centrally located intake pipe opening extending upwardly from the lower face of said base member and terminating as a central chamber open at its lower end, an upper overflow pipe opening positioned above said central chamber, a lower return pipe opening, a communicating passageway formed within said base member and providing a conduit between said upper overflow pipe opening and said return pipe opening, and a communicating passageway connecting said central chamber with the upper face of said base member and distributing chamber.

6. In a liquid dispensing apparatus, a dispensing receptacle, including in its lower portion a base member having formed therein a centrally located intake pipe opening extending upwardly and terminating as a central chamber open at its lower end, an upper overflow pipe opening positioned above said central chamber, a lower return pipe opening, a communicating passageway formed within said base member and providing a conduit between said upper overflow pipe opening and said return pipe opening, and extending as an annular channel about the walls of said central chamber, and communicating pipes extending from said central chamber to the space above said base member and extending through said annular channel.

7. In a liquid dispensing apparatus, a transparent dispensing receptacle, a dispensing outlet and hose therefor, an overflow return connection comprising an upright pipe member extending upwardly from the lower part of said receptacle and terminating with its upper end open and at a predetermined point in said receptacle and visible from the exterior of said receptacle, and a series of supply conduits extending laterally and radially from a position adjacent the base of said upright pipe member and visible from the exterior of said receptacle.

8. In a liquid dispensing apparatus, a transparent dispensing receptacle, a dispensing outlet and hose therefor, an upwardly extending hollow enlargement in the lower part of said receptacle, an overflow return connection, comprising an upright pipe member extending upwardly from said enlargement, and a supply conduit extending through the side wall of said enlargement, adjacent the lower end of said upright pipe member.

In testimony whereof I affix my signature.

ANGUS McKELLAR.